United States Patent
Compton et al.

(10) Patent No.: US 10,473,868 B2
(45) Date of Patent: Nov. 12, 2019

(54) OPTICAL CONNECTOR PLUG HAVING A REMOVABLE AND REPLACEABLE MATING INTERFACE

(71) Applicant: Corning Optical Communications LLC, Hickory, NC (US)

(72) Inventors: Brandon Duvall Compton, Granite Falls, NC (US); Tory Allen Klavuhn, Newton, NC (US); Hieu Vinh Tran, Charlotte, NC (US)

(73) Assignee: Corning Optical Communications, LLC, Charlotte, NC (US)

(*) Notice: Subject to any disclaimer, the term of this patent is extended or adjusted under 35 U.S.C. 154(b) by 0 days.

(21) Appl. No.: 15/337,257

(22) Filed: Oct. 28, 2016

(65) Prior Publication Data
US 2017/0153398 A1 Jun. 1, 2017

Related U.S. Application Data

(60) Provisional application No. 62/261,009, filed on Nov. 30, 2015.

(51) Int. Cl.
*G02B 6/38* (2006.01)

(52) U.S. Cl.
CPC ............ *G02B 6/389* (2013.01); *G02B 6/3825* (2013.01); *G02B 6/3893* (2013.01)

(58) Field of Classification Search
CPC .... G02B 6/3895; G02B 6/3821; G02B 6/387; G02B 6/3831; G02B 6/3894; G02B 6/3825; G02B 6/3893
See application file for complete search history.

(56) References Cited

U.S. PATENT DOCUMENTS

| | | | | |
|---|---|---|---|---|
| 6,648,520 B2* | 11/2003 | McDonald | ........... | G02B 6/3869 385/59 |
| 6,899,467 B2 | 5/2005 | McDonald et al. | | |
| 6,962,445 B2* | 11/2005 | Zimmel | ............... | G02B 6/3825 385/55 |
| 7,044,650 B1* | 5/2006 | Tran | ..................... | G02B 6/3874 385/54 |
| 7,090,406 B2 | 8/2006 | Melton et al. | | |
| 7,090,407 B2* | 8/2006 | Melton | ................ | G02B 6/3849 385/147 |
| 7,111,990 B2 | 9/2006 | Melton et al. | | |
| 7,113,679 B2 | 9/2006 | Melton et al. | | |
| 7,137,742 B2 | 11/2006 | Theuerkorn et al. | | |
| 7,244,066 B2 | 7/2007 | Theuerkorn | | |
| 7,264,402 B2 | 9/2007 | Theuerkorn et al. | | |
| 7,338,214 B1 | 3/2008 | Gurreri et al. | | |
| 7,568,844 B2* | 8/2009 | Luther | ................. | G02B 6/3869 385/52 |

(Continued)

OTHER PUBLICATIONS

US 7,481,586 B2, 01/2009, Lu et al. (withdrawn)

*Primary Examiner* — Ryan A Lepisto
(74) *Attorney, Agent, or Firm* — Michael E. Carroll, Jr.

(57) ABSTRACT

Disclosed are optical plug connectors that can be converted from a first mating interface to a second mating interface that is different than the first mating interface. The optical plug connector comprises a plug body, a shroud, a ferrule and a first coupling member for securing the optical plug connector. The shroud comprises a first mating interface configuration that may be removed and replaced with a shroud having a second mating interface configuration.

26 Claims, 8 Drawing Sheets

(56) References Cited

U.S. PATENT DOCUMENTS

| | | |
|---|---|---|
| 7,572,065 B2 * | 8/2009 | Lu .................. G02B 6/3816 385/55 |
| 7,654,747 B2 | 2/2010 | Theuerkorn et al. |
| 7,677,814 B2 | 3/2010 | Lu et al. |
| 7,744,288 B2 | 6/2010 | Lu et al. |
| 7,785,019 B2 | 8/2010 | Lewallen et al. |
| 7,794,155 B1 | 9/2010 | Haley et al. |
| 7,942,590 B2 | 5/2011 | Lu et al. |
| 9,733,436 B2 | 8/2017 | Van Baelen et al. |
| 2008/0050070 A1 | 2/2008 | Gurreri et al. |
| 2010/0329611 A1 | 12/2010 | Haley et al. |
| 2011/0075971 A1 | 3/2011 | Elenbaas et al. |

* cited by examiner

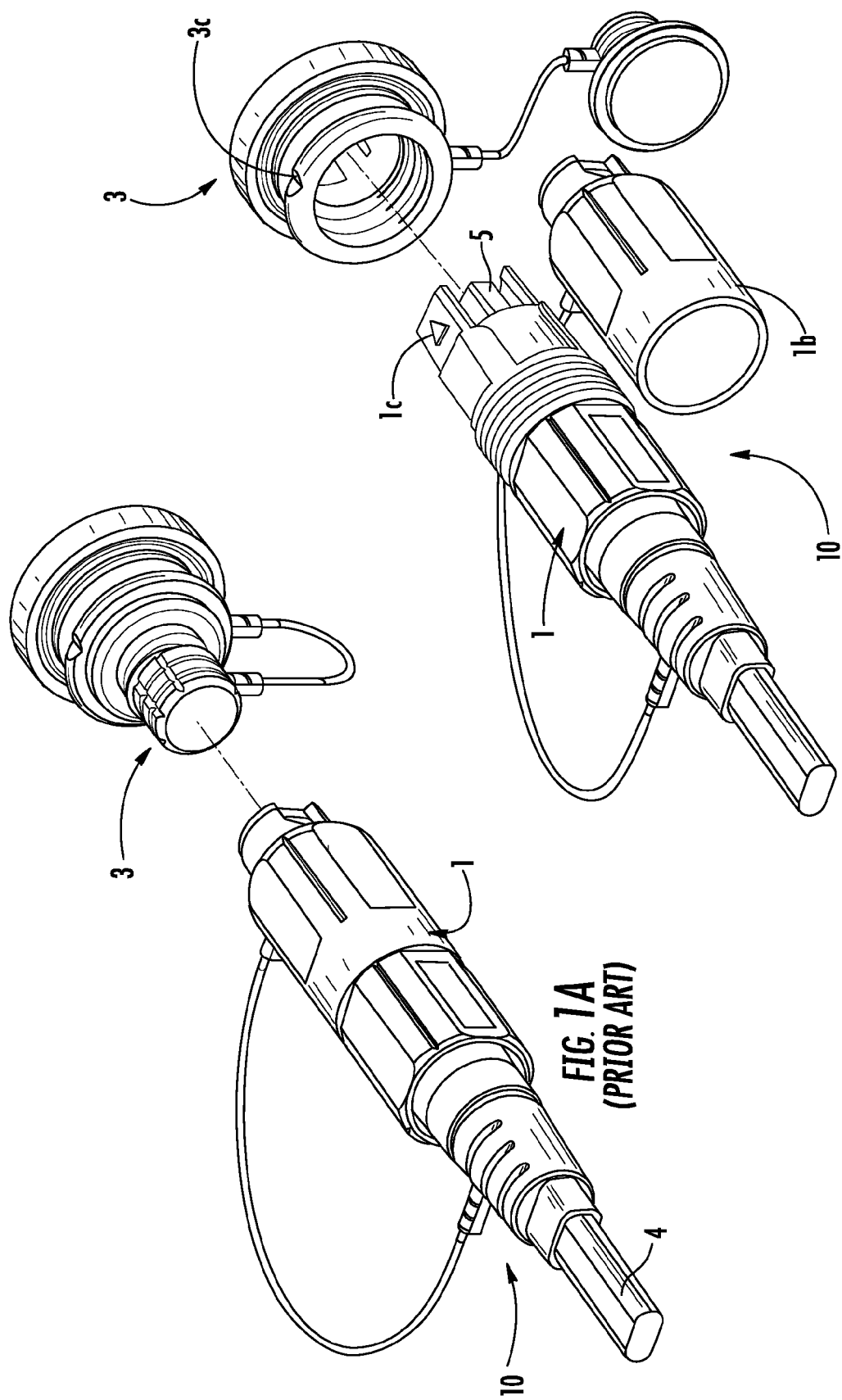

OPTICAL CONNECTOR PLUG HAVING A REMOVABLE AND REPLACEABLE MATING INTERFACE

CROSS-REFERENCE TO RELATED APPLICATIONS

This application claims the benefit of priority under 35 U.S.C. § 119 to U.S. Provisional Application No. 62/261,009, filed on Nov. 30, 2015, and is incorporated herein by reference.

FIELD

The disclosure is directed to optical connector plugs that can be converted from a first mating interface to a second mating interface. More specifically, the disclosure is directed to hardened optical plug connectors that can be changed between one or more mating interfaces for mating with different optical ports.

BACKGROUND

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data. On the other hand, an optical waveguide is capable of transmitting an extremely large amount of bandwidth compared with a copper conductor. Moreover, an optical waveguide cable is much lighter and smaller compared with a copper cable having the same bandwidth capacity. Consequently, optical waveguide cables replaced most of the copper cables in long-haul communication network links, thereby providing greater bandwidth capacity for long-haul links. However, many of these long-haul links have bandwidth capacity that is not being used. This is due in part to communication networks that use copper cables for distribution and/or drop links on the subscriber side of the central office. In other words, subscribers have a limited amount of available bandwidth due to the constraints of copper cables in the communication network. Stated another way, the copper cables are a bottleneck that inhibit the subscriber from utilizing the relatively high-bandwidth capacity of the long-hauls links.

As optical waveguides are deployed deeper into communication networks, subscribers will have access to increased bandwidth. But there are certain obstacles that make it challenging and/or expensive to route optical waveguides/optical cables deeper into the communication network, i.e., closer to the subscriber. For instance, making a suitable optical connection between optical waveguides is much more difficult than making an electrical connection between copper wires. This is because optical connections require special tools and equipment, highly trained craftsman, along with precision components. Additionally, as the communication network pushes toward subscribers, the communication network requires more connections, which compounds the difficulties of providing optical waveguides to the premises of the subscriber.

One common way to connect optical waveguides suitable in an outdoor environment is by using hardened optical connectors. Hardened optical connectors generally hold the mating optical waveguides in respective ferrules of the mated connectors and/or receptacles. Hardened optical connectors often have mating interfaces with alignment and/or keying features for preventing the connection with a mismatched complimentary device. However, there may be occasions where an installed base of products in the field such as receptacles or ports in an enclosure are not compatible with the desired hardened connector.

Consequently, there is an unresolved need for optical plug connectors that may use several different mating interfaces. The concepts disclosed herein solve this unresolved need for optical plug connectors.

SUMMARY

The disclosure is directed to optical plug connectors comprising a removable and replaceable mating interface so that the connector may be changed by the user in the field as desired.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIGS. 1A-1C shows a portion of a conventional optical fiber plug connector having a fixed mating interface being plugged into a complimentary receptacle according to the prior art.

DETAILED DESCRIPTION

Reference will now be made in detail to the preferred embodiments of the disclosure, examples of which are illustrated in the accompanying drawings. Whenever possible, like reference numbers will be used to refer to like components or parts.

One example of a commercially successful hardened connector is an OptiTap® plug connector such as disclosed in U.S. Pat. No. 7,090,406, the content of which is incorporated herein by reference. The OptiTap connector has a mating interface that cooperates with a complimentary adapter; however, the OptiTap connector will not mate with other types of adapters that may be installed in the field. Other types of connectors allow the building of plug connectors with different mating interfaces using a common connector platform in the factory, but once the connector is built the mating interface of connector cannot be changed due the permanent construction of the plug connector. The concepts disclosed herein allow the user to change the mating interface of the optical plug connector in the field by using one or more different removable parts that can be interchanged to allow a different mating interface for the optical plug connector. Consequently, the user has the advantage of not being limited to the mating interface that the optical connector plug has as built since the mating interface may be changed as desired.

Figure 1C:
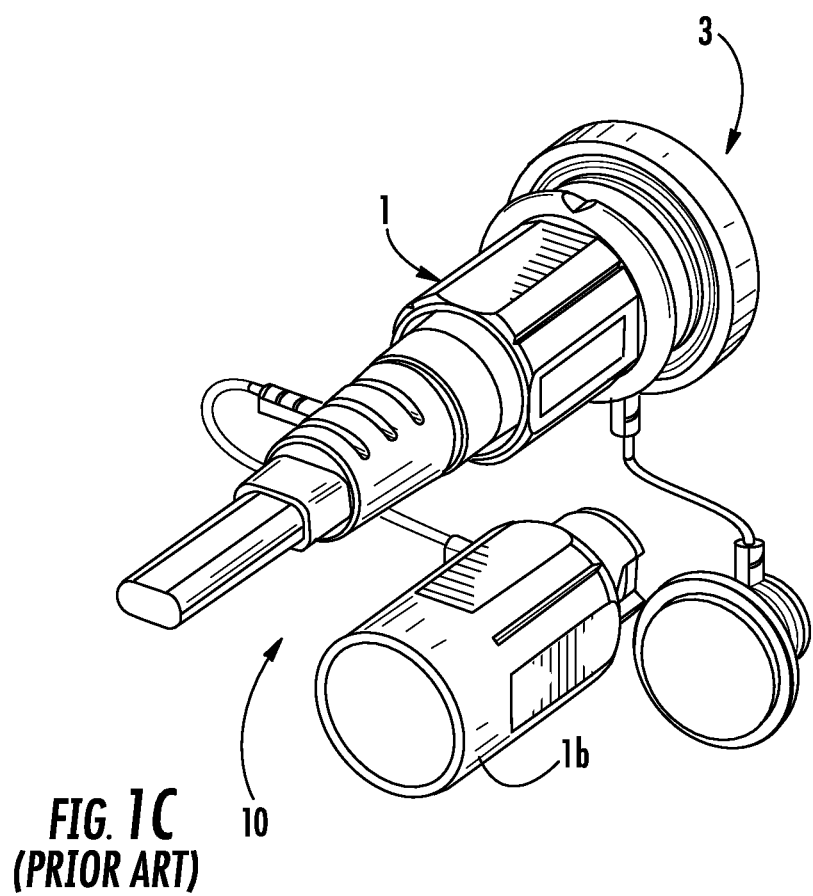

FIGS. 1A-1C show the various stages during the mating of a conventional optical fiber plug connector 1 of preconnectorized cable assembly 10 with receptacle 3. Conventional optical fiber plug connector 1 has a fixed mating interface and is depicted as an OptiTap plug connector, but other conventional optical fiber plug connectors also have fixed mating interfaces that will only mate with other complimentary adapters or ports. On the other hand, the concepts of the optical plug connectors of disclosed herein have a mating interface that can be advantageously removed and replaced so that the mating interface of the optical plug connector may be changed by the user in the field to mate with different receptacles and/or ports as desired.

Figure 2:
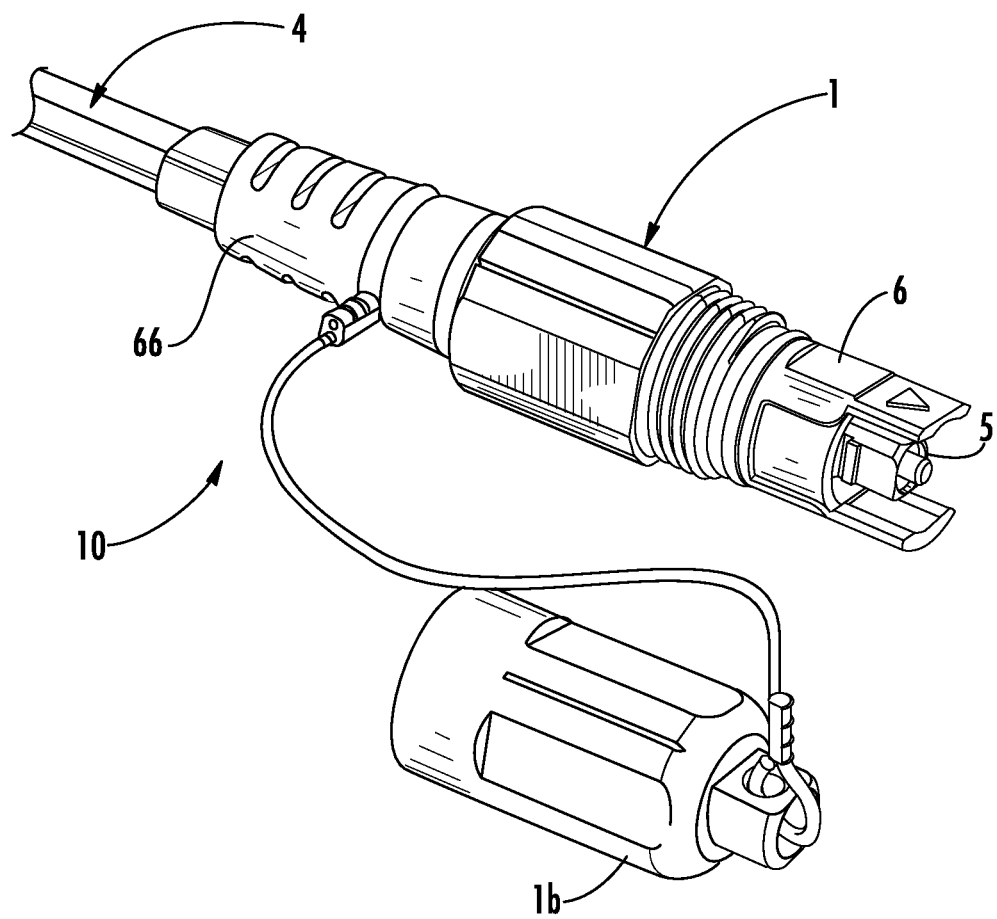
FIGS. 2 and 3 respectively are an assembled perspective view and an exploded view of the conventional optical fiber plug connector of FIGS. 1A-1C.

Specifically, FIG. 1A shows a complimentary receptacle 3 detached from conventional optical fiber plug connector 1 of preconnectorized cable assembly 10. Moreover, conventional optical fiber plug connector 1 and receptacle 3 are depicted with their respective protective caps on. Protective cap 1b is used for shielding a connector assembly 5, and in particular, the end face of a connector ferrule 5b from the elements and/or damage. Specifically, installed protective cap 1b isolates connector ferrule 5b from the elements and prevents it from being damaged during transportation and handling. FIG. 1B shows protective cap 1b removed from the end conventional optical fiber plug connector 1. Likewise, the respective cap of receptacle 3 is also removed. Conventional optical fiber plug connector 1 is positioned to engage the complimentary portions of receptacle 3 and is not suitable for mating with other receptacles. Specifically, an alignment indicia 1c of conventional optical fiber plug connector 1 is positioned to its complementary indicia 3c of receptacle 3. FIG. 1c shows a mated connection between the conventional optical fiber plug connector 1 and receptacle 3, thereby making an optical connection therebetween. In this case, the mating between the conventional plug connector and the receptacle is secured using a threaded engagement, but other optical plug connectors may use other types of structures for securing the optical connection and make them further incompatible with different receptacles. For instance, the securing means may use a quarter-turn lock, a quick release, a push-pull latch, or a bayonet configuration. FIG. 2 depicts a front perspective view of the conventional optical fiber plug connector 1 and FIG. 3 depicts an exploded view of the same.

Figure 3:
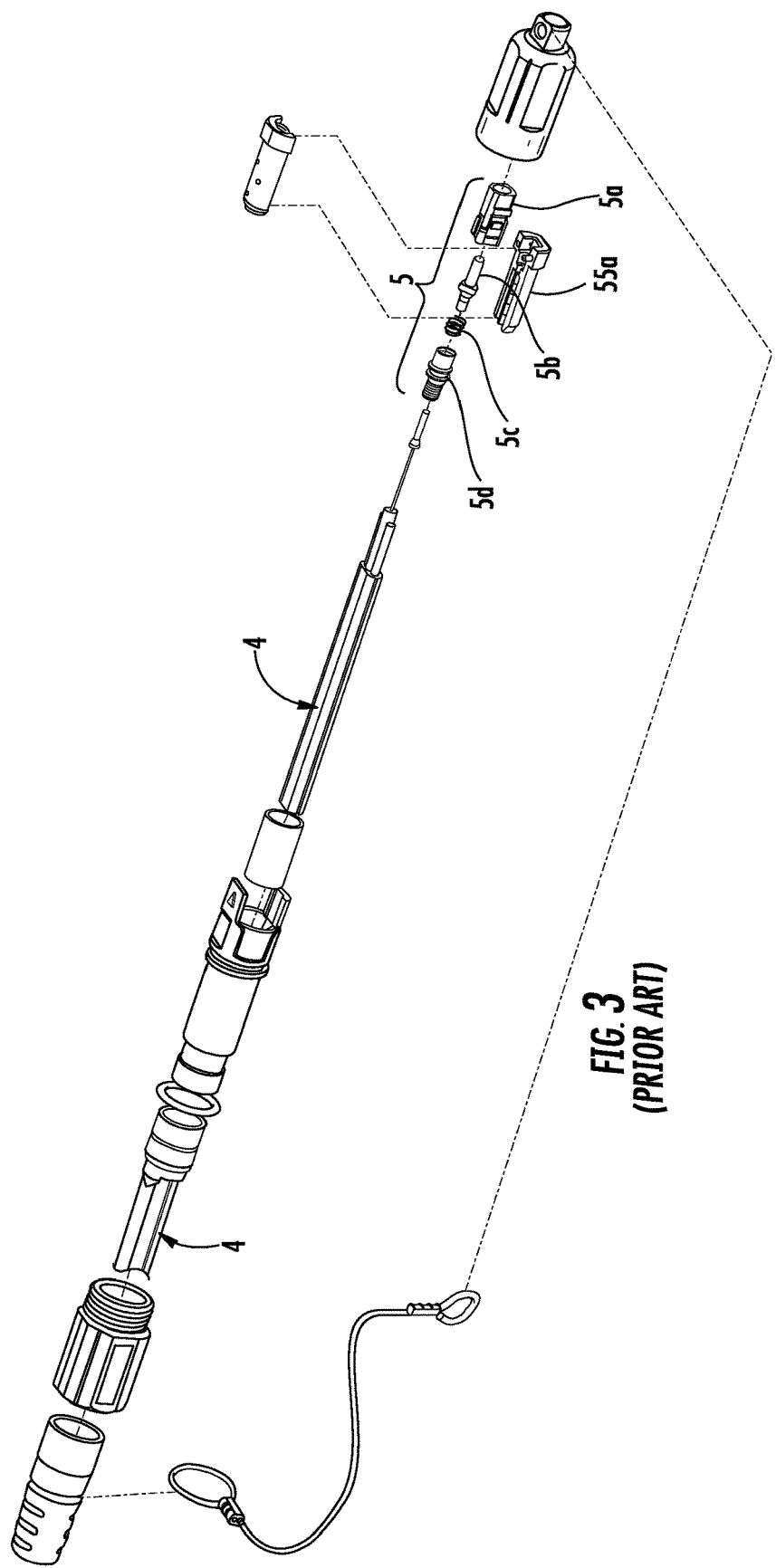
Figure 4:
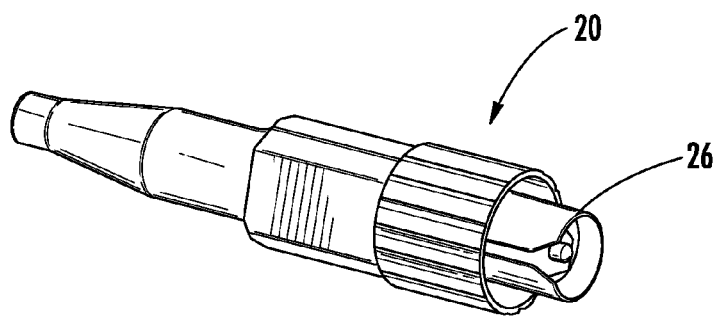
FIG. 4 is a perspective view of another conventional optical fiber plug connector having a fixed mating interface according to the prior art.

As shown in FIG. 3, conventional optical fiber plug connector 1 uses an industry standard SC type connector assembly 5 having a connector body 5a, a ferrule 5b in a ferrule holder (not numbered), a spring 5c, and a spring push 5d. Conventional optical fiber plug connector 1 also includes a crimp assembly (not numbered) that includes a crimp housing having a first and second shell and a crimp band, a shroud 6 having an O-ring on the shaft for sealing, a coupling nut, a cable boot, a heat shrink tube, and a protective cap secured to boot by a wire assembly. As best shown in FIG. 2, at least the configuration of the shroud 6 makes conventional optical fiber plug connector 1 have a specific fixed mating interface that will not work with other receptacles. By way of example, FIG. 4 depicts another conventional optical fiber plug connector 20 having a fixed mating interface with a different shroud configuration 26 that will not mate with receptacle 3. Likewise, the complimentary receptacle (not shown) for conventional optical fiber plug connector 20 will not mate conventional optical fiber plug connector 1.

Figure 5:
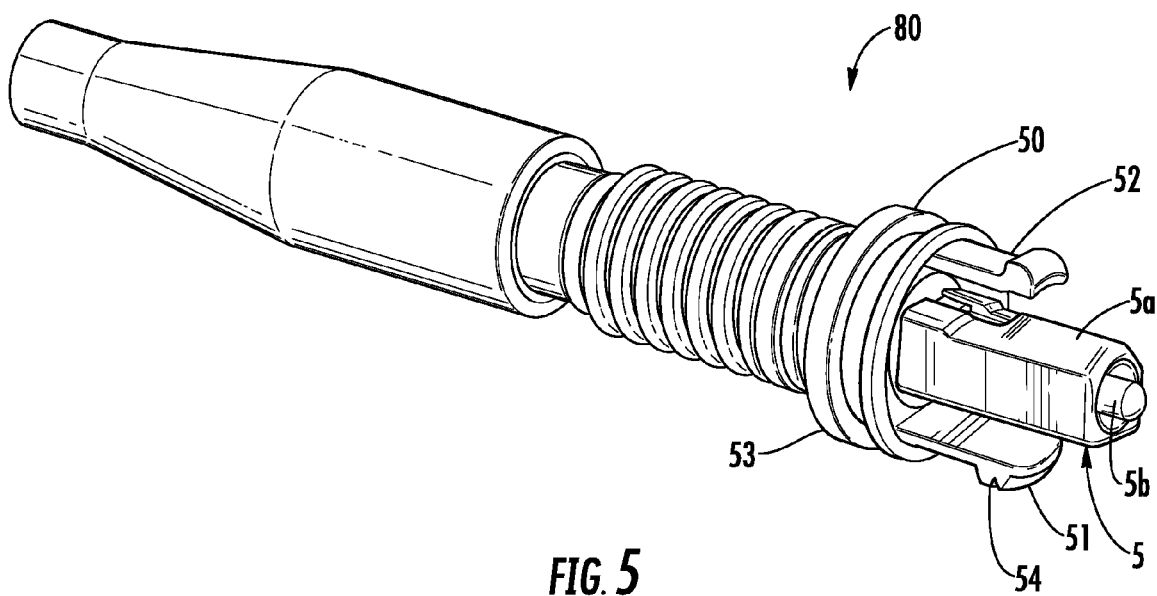
FIG. 5 is a partially assembled perspective view of an optical plug connector having a construction with a mating interface that can be changed by the user according the present application.
Figure 6:
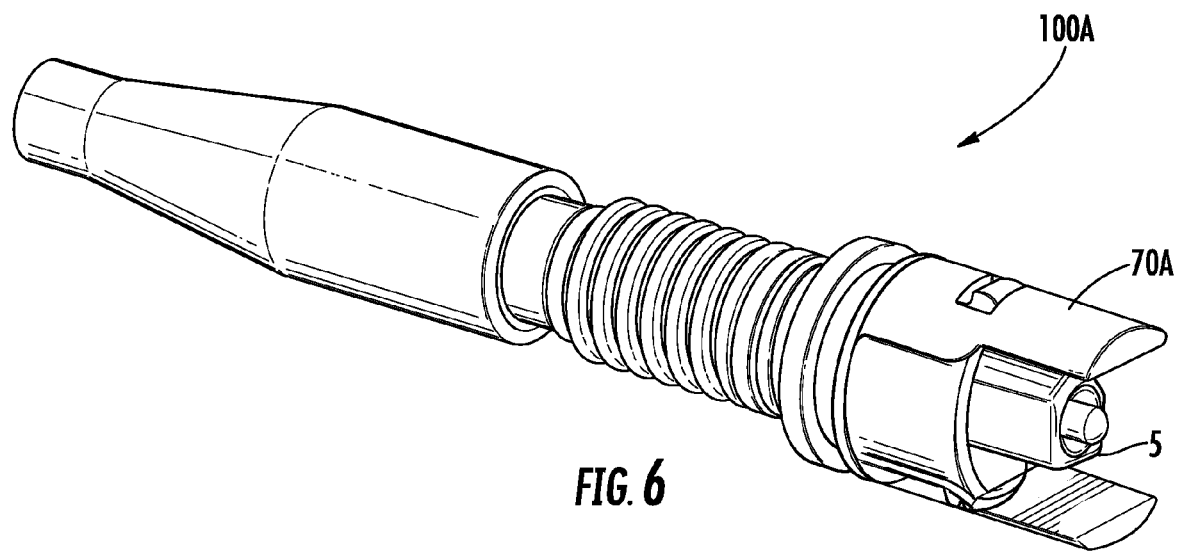
FIG. 6 depicts the assembly of FIG. 5 with a shroud having a first mating interface for the optical plug connector.
Figure 7:
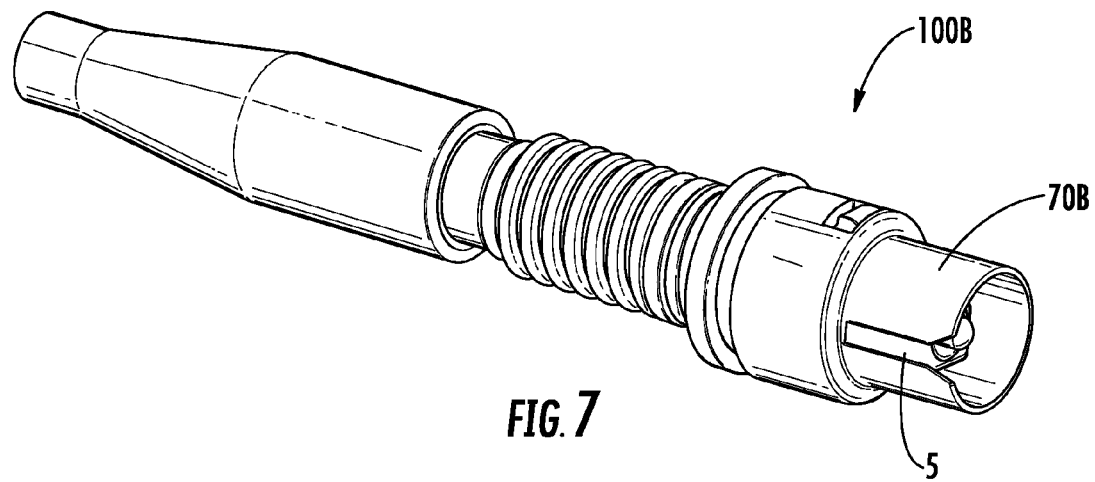
FIG. 7 depicts the assembly of FIG. 5 with a shroud having a second mating interface for the optical plug connector.

FIG. 5 is a partially assembled perspective view of an sub-assembly portion 80 of an optical plug connector 100 having a construction with a mating interface that can be changed by the user according the present application. FIGS. 6 and 7 respectively depict the sub-assembly portion 80 formed into a first optical plug connector 100A (without the coupling member shown) by further comprising a first shroud 70A for creating a first mating interface and a second optical plug connector 100B (without the coupling member shown) further comprising a second shroud 70B for creating a second mating interface. The first and second optical plug connectors 100A and 100B have different mating interfaces such as defined by the different shroud configurations. Specifically, the first shroud 70A comprises a first opening 74A extending from the front end to a medial portion of the shroud 70A and a second opening 74B extending from the front end to a medial portion of the shroud 70A. On the other hand, the second shroud 70B comprises a single opening (not a first and second opening like shroud 70A) extending from the front end to a medial portion of the shroud 70B. Thus, the optical plug connector has a removable and a replaceable mating interface via the removable and replaceable shrouds that may be interchanged by the user as desired to change the mating face. Unlike conventional prior art the concepts disclosed herein does not have a fixed mating interface that cannot be changed without damaging or destroying the connector.

Returning to the construction of optical plug connector 100, it comprises a ferrule 5b, a body 50 comprising a front end 51 and a rear end 53 with the front end 51 comprising at least one retention feature 52, a shroud 70 comprising a first mating interface configuration at a front end 71 and at least one attachment feature 72 disposed at a medial portion that cooperates with the at least one retention feature 52 of the body 50 so that the shroud 70A,70B is removably attached to the body 50, and a first coupling member 80A,80B (FIGS. 10A and 10B) for securing the optical plug connector during mating.

FIG. 6 depicts the assembly of FIG. 5 with a shroud having a first mating interface for the optical plug connector.

FIG. 7 depicts the assembly of FIG. 5 with a shroud having a second mating interface for the optical plug connector.

Figure 8:
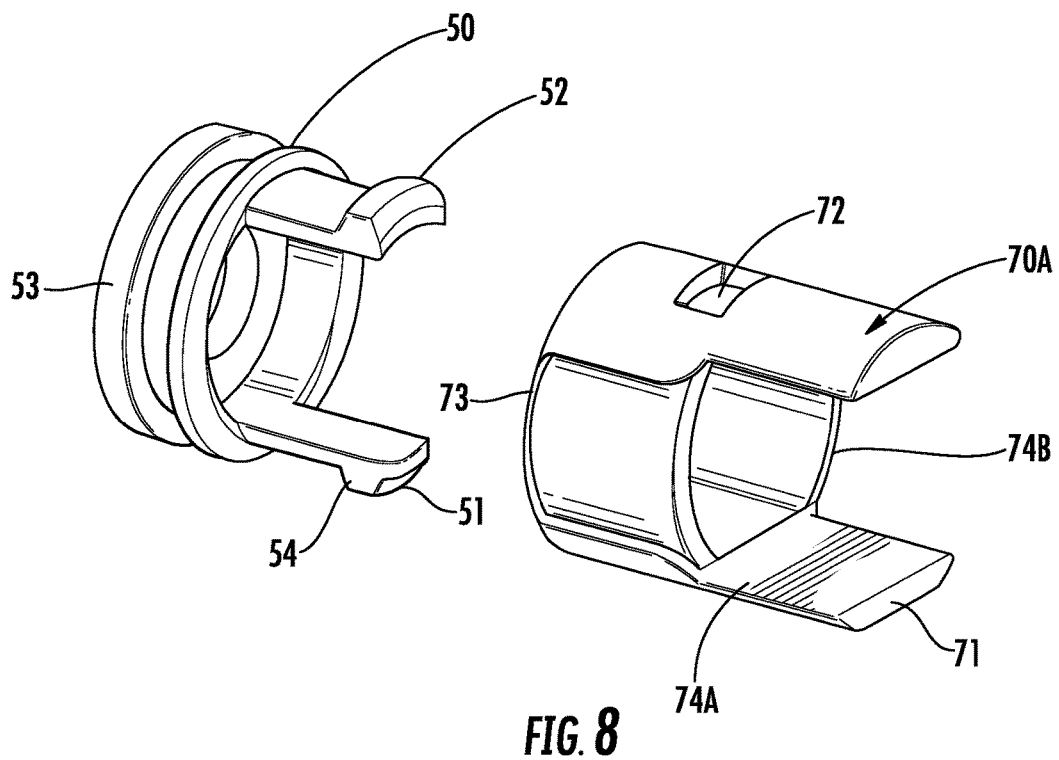
FIG. 8 depicts the assembly of FIG. 6 with the body and the shroud of the first mating interface for the optical plug connector.

FIG. 8 depicts the assembly of FIG. 6 with the body and the shroud of the first mating interface for the optical plug connector.

Figure 9:
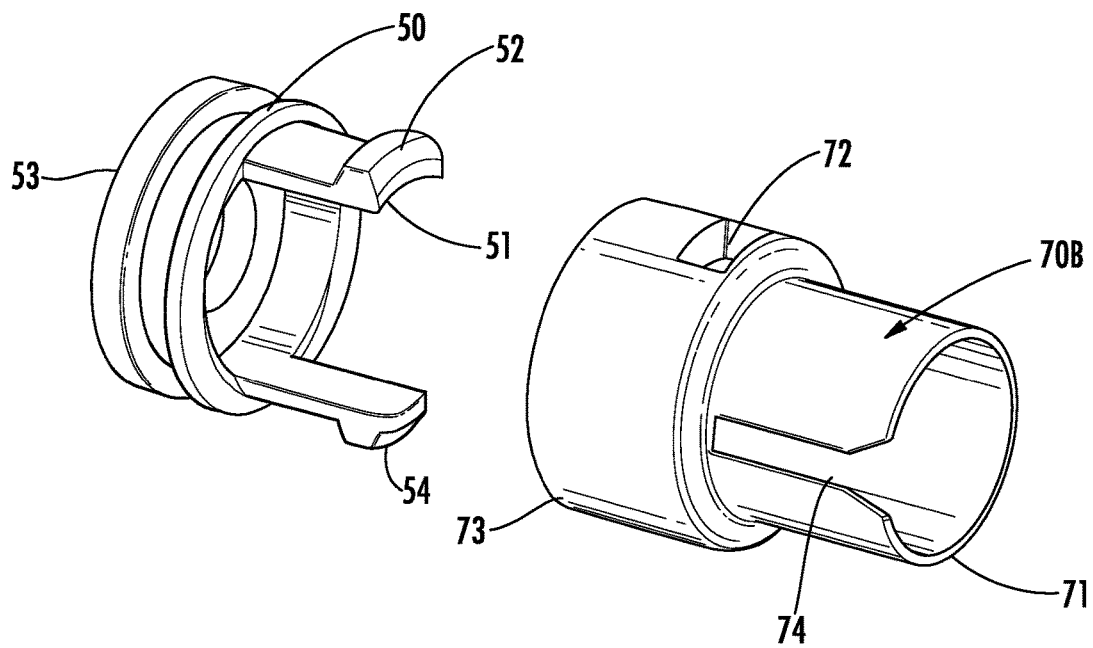
FIG. 9 depicts the assembly of FIG. 7 with the body and the shroud of the second mating interface for the optical plug connector.

FIG. 9 depicts the assembly of FIG. 7 with the body and the shroud of the second mating interface for the optical plug connector.

Optical plug connectors depicted use a connector assembly 52 of the SC type, but other types of connector assemblies such as LC, FC, ST, MT, and MT-RJ are contemplated by the concepts disclosed herein. Moreover, suitable connector assemblies may be used with suitable cables according to the concepts of the present invention, thereby resulting in numerous cable/connector combinations.

Figure 10A:
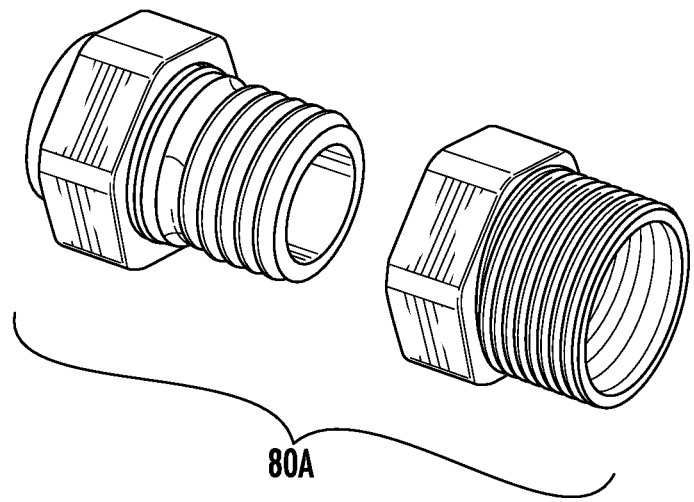
FIGS. 10A and 10B depict different coupling members that may be used with concepts of the optical plug connectors disclosed herein.
Figure 10B:
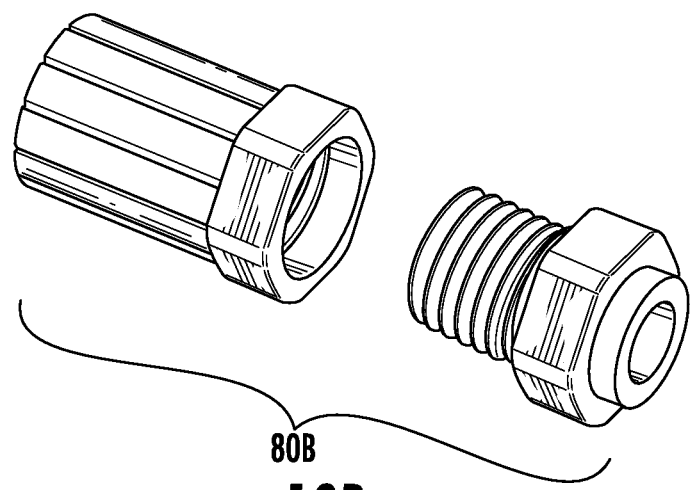

FIGS. 10A and 10B depict different coupling members that may be used with concepts of the optical plug connectors disclosed herein. Still other variations are possible for the optical receptacle using the concepts disclosed. Of course, other embodiments are possible according to the present invention. For instance, connector body 5a may be integrally molded into the housing or the connector could have other securing means such as an ST-type configuration so that a twisting motion of the optical plug connector secures it with a complementary mating receptacle.

Generally speaking, most of the components of the optical plug connector are formed from a suitable polymer. Preferably, the polymer is a UV stabilized polymer such as ULTEM 2210 available from GE Plastics; however, other suitable materials are possible. For instance, stainless steel or any other suitable metal may be used for various components.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. An optical plug connector, comprising:
   a connector body positioned at a front end of the optical plug connector;
   a ferrule positioned at least partially within the connector body;
   a body extending around and spaced radially apart from the connector body, the body comprising a front end and a rear end, and the front end comprising at least one retention feature, wherein the at least one retention feature of the body comprises one or more latch arms;
   a shroud extending around and spaced radially apart from the ferrule, the shroud comprising:
      a first mating interface configuration at a front end;
      at least one attachment feature at a rear end that cooperates with the at least one retention feature of the body so that the shroud is removably attached to the body, optical plug connector; and
      at least one opening extending from the front end of the shroud to a medial portion of the shroud in an axial direction, the at least one opening extending around a discrete portion of a perimeter of the shroud, wherein the ferrule is accessible through the at least one opening; and
   a first coupling member for securing the optical plug connector during mating.

2. The optical plug connector of claim 1, wherein the shroud further comprises a second opening extending from the front end of the shroud to the medial portion of the shroud in the axial direction and extending around at least a portion of the perimeter of the shroud.

3. The optical plug connector of claim 1, wherein the body comprises an orientation feature to enable the shroud to attach to the body in only one orientation.

4. The optical plug connector of claim 1, wherein the shroud comprises an orientation feature so that the shroud attaches to the body in only one orientation.

5. The optical plug connector of claim 1, wherein the at least one retention feature of the body comprises a first latch arm and a second latch arm, wherein the first latch arm has a different configuration than the second latch arm so the shroud can be attached to the body in only one orientation.

6. The optical plug connector of claim 1, wherein the at least one attachment feature of the shroud comprises a first window and a second window, wherein the first window has a different configuration than the second window so the shroud can be attached to the body in only one orientation.

7. The optical plug connector of claim 1, wherein the shroud comprises a keying feature so the shroud mates in only one orientation.

8. The optical plug connector of claim 1, wherein a portion of the first coupling member can be removed and replaced with a portion of a second coupling member for changing a coupling member configuration for the optical plug connector.

9. The optical plug connector of claim 1, wherein the ferrule is a portion of a connector assembly.

10. The optical plug connector of claim 1, wherein the front end of the shroud extends beyond a front face of the ferrule.

11. The optical plug connector of claim 1 being a portion of a cable assembly having an optical fiber attached to the ferrule.

12. A method of reconfiguring a mating face of an optical plug connector, comprising:
   providing an optical plug connector according to claim 1; and removing the shroud from the optical plug connector; and
   installing a second shroud to the body, wherein the second shroud has a second mating interface configuration that is different than the first mating interface configuration.

13. An optical plug connector, comprising:
   a connector assembly comprising a connector housing, a spring, and a ferrule comprising a front face;
   a body extending around and spaced radially apart from the connector housing, the body comprising a front end and a rear end, the front end comprising at least one retention feature, wherein the at least one retention feature of the body comprises one or more latch arms;
   a shroud extending around and spaced radially apart from the ferrule, the shroud comprising:
      a first mating interface configuration at a front end;
      at least one attachment feature at a rear end that cooperates with the at least one retention feature of the body so that the shroud removably attaches to the body, the optical plug connector, wherein the front end of the shroud extends beyond the front face of the ferrule; and
      at least one opening extending from the front end of the shroud to a medial portion of the shroud in an axial direction, and extending around a discrete portion of a perimeter of the shroud, wherein the ferrule is accessible through the at least one opening; and a first coupling member for securing the optical plug connector during mating.

14. The optical plug connector of claim 13, wherein the shroud further comprises a second opening extending from the front end of the shroud to the medial portion of the shroud in the axial direction and extending around at least a portion of the perimeter of the shroud.

15. The optical plug connector of claim 13, wherein the body comprises an orientation feature so that the shroud attaches to the body in only one orientation.

16. The optical plug connector of claim 13, wherein the shroud comprises an orientation feature so that the shroud attaches to the body in only one orientation.

17. The optical plug connector of claim 13, wherein the at least one retention feature of the body comprises a first latch arm and a second latch arm, wherein the first latch arm has a different configuration than the second latch arm so the shroud attaches to the body in only one orientation.

18. The optical plug connector of claim 13, the at least one attachment feature of the shroud comprises a first window and a second window, wherein the first window has a different configuration than the second window so the shroud attaches to the body in only one orientation.

19. The optical plug connector of claim 13, wherein the shroud comprises a keying feature so the shroud mates in only one orientation.

20. The optical plug connector of claim 13, wherein a portion of the first coupling member can be removed and replaced with a portion of a second coupling member for changing a coupling member configuration for the optical plug connector.

21. The optical plug connector of claim 13 being a portion of a cable assembly having an optical fiber attached to the ferrule.

22. An optical plug connector, comprising:
a connector assembly comprising a connector housing, a spring, and a ferrule comprising a front face;
a body extending around and spaced radially apart from the connector housing, the body comprising a front end and a rear end, the front end comprising at least one retention feature, wherein the at least one retention feature of the body comprises a first latch arm and a second latch arm, wherein the first latch arm has a different configuration than the second latch arm;
a shroud extending around and spaced radially apart from the ferrule, the shroud comprising:
a first mating interface configuration at a front end;
at least one attachment feature at a rear end that cooperates with the at least one retention feature of the body so that the shroud removably attaches to the optical plug connector, wherein the at least one attachment feature of the shroud comprises a first window and a second window, and the first window has a different configuration than the second window so the shroud attaches to the body in only one orientation, and wherein the front end of the shroud extends beyond the front face of the ferrule; and
at least one opening extending from the front end of the shroud to a medial portion of the shroud in an axial direction, and extending around a discrete portion of a perimeter of the shroud, wherein the ferrule is accessible through the at least one opening; and
a first coupling member for securing the optical plug connector during mating.

23. The optical plug connector of claim 22, wherein the shroud further comprises a second opening extending from the front end to the medial portion of the shroud in the axial direction and extending around at least a portion of the perimeter of the shroud.

24. The optical plug connector of claim 22, wherein the shroud comprises a keying feature so the shroud mates in only one orientation.

25. The optical plug connector of claim 22, wherein a portion of the first coupling member can be removed and replaced with a portion of a second coupling member for changing a coupling member configuration for the optical plug connector.

26. The optical plug connector of claim 22 being a portion of a cable assembly having an optical fiber attached to the ferrule.

* * * * *